No. 647,890. Patented Apr. 17, 1900.
M. T. STONE.
PANORAMIC CAMERA.
(Application filed Sept. 28, 1899.)

(No Model.) 2 Sheets—Sheet 1.

WITNESSES:
Jos. A. Ryan
M. D. Blondell

INVENTOR
Melvin T. Stone.
BY Munn & Co.
ATTORNEYS

No. 647,890. Patented Apr. 17, 1900.
M. T. STONE.
PANORAMIC CAMERA.
(Application filed Sept. 28, 1899.)
(No Model.) 2 Sheets—Sheet 2.
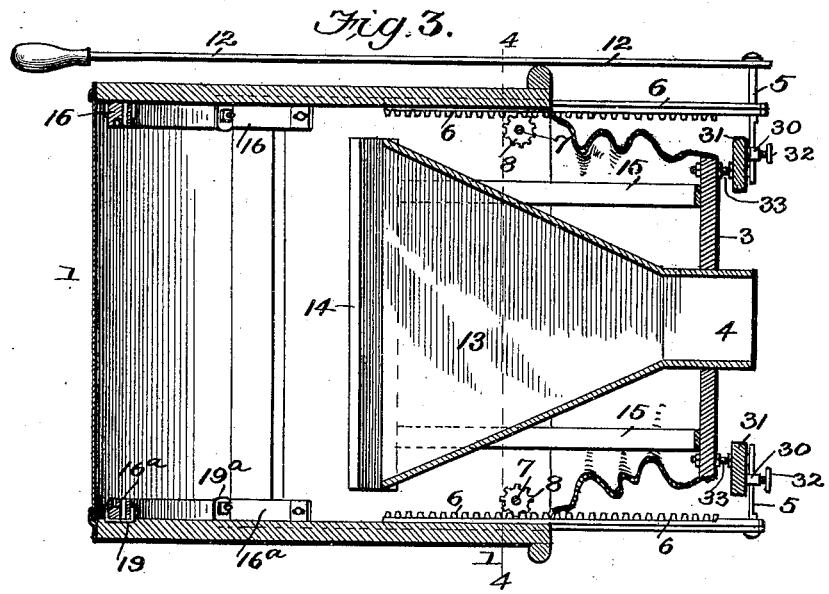
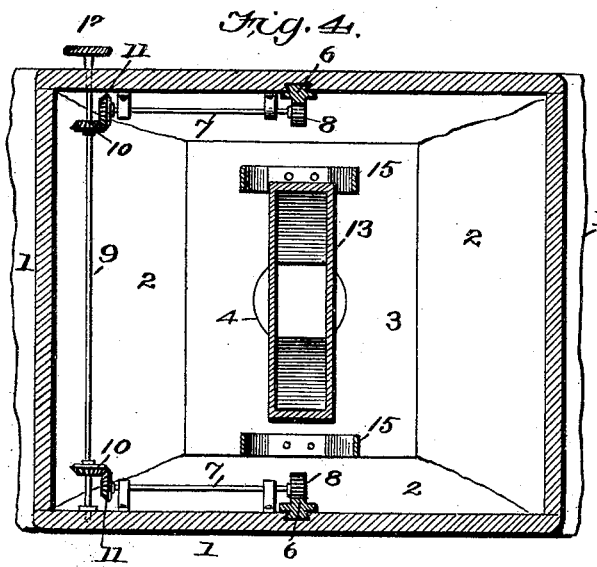
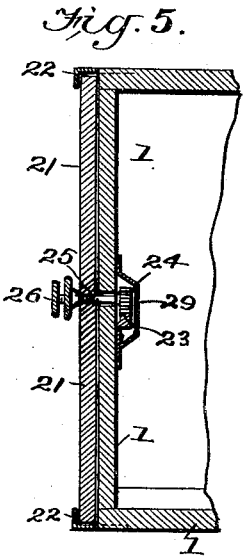
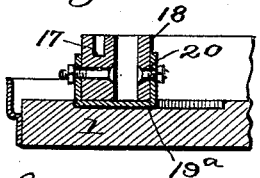
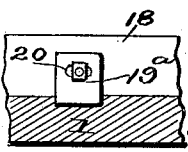
WITNESSES:
Jos. A. Ryan
M. D. Blondel
INVENTOR
Melvin T. Stone
BY Munn & Co.
ATTORNEYS

UNITED STATES PATENT OFFICE.

MELVIN T. STONE, OF MOBILE, ALABAMA.

PANORAMIC CAMERA.

SPECIFICATION forming part of Letters Patent No. 647,890, dated April 17, 1900.

Application filed September 28, 1899. Serial No. 731,944. (No model.)

*To all whom it may concern:*

Be it known that I, MELVIN THOMAS STONE, residing at Mobile, in the county of Mobile and State of Alabama, have invented a new and useful Improvement in Panoramic Cameras, of which the following is a specification.

The chief feature of my improvement is a flexible or, more properly, an elastic adjustable holder for the sensitized film and the ground-film upon which the image is focused, whereby the image thrown on the film by the lens may be rendered sharp at every point. Such holder is employed and particularly useful with a lens which is adapted for adjustment of focus corresponding to the distance of the camera from the object to be photographed.

My invention also includes other features of novelty and utility, as hereinafter described and claimed.

Figure 1:
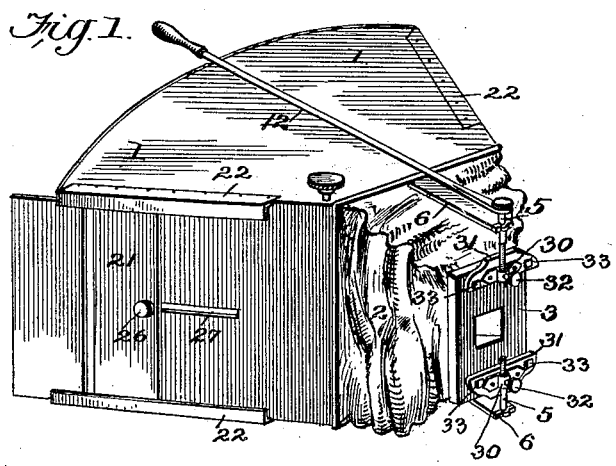
Figure 2:
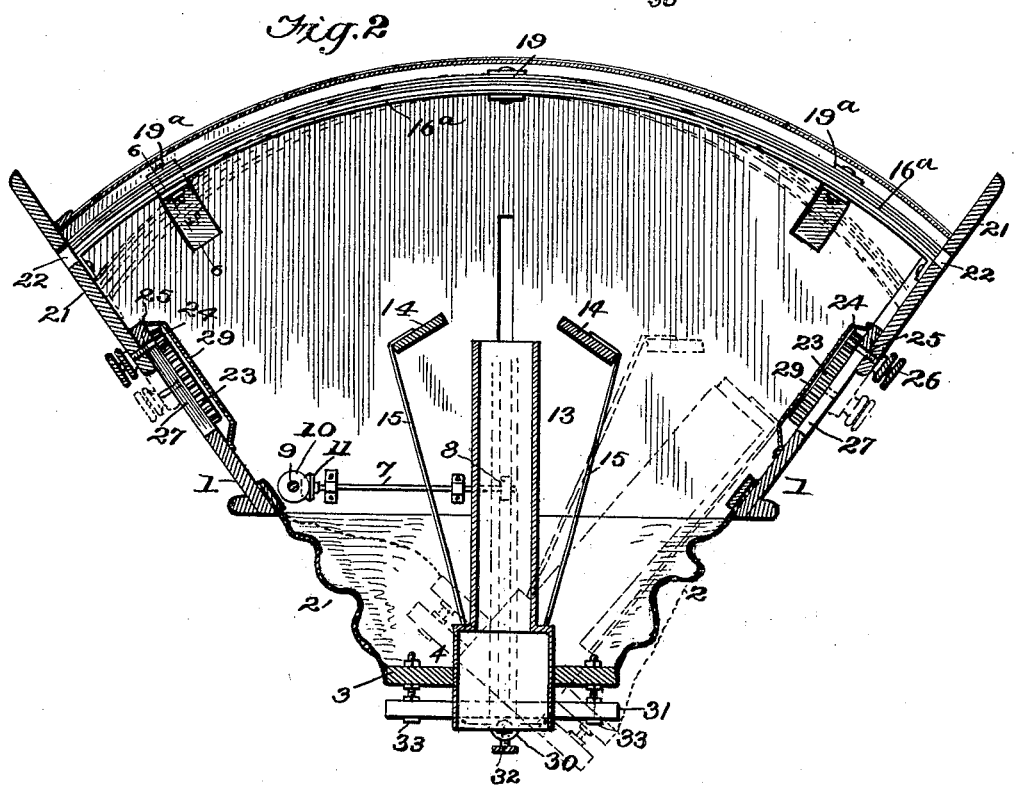

Figure 1 is a perspective view of my camera. Fig. 2 is an enlarged central horizontal section. Fig. 3 is a central vertical section. Fig. 4 is a vertical transverse section on line 4 4 of Fig. 3. Fig. 5 is a detail vertical section. Fig. 6 is an enlarged section of the lower film-holder on line 6 6 of Fig. 2. Fig. 7 is a detail section of a portion of said holder.

The body or box 1 of the camera has the form of a truncated sector. A flexible bellows-like tube 2, composed of leather or some other suitable material, is secured to such truncated end and to the front plate or board 3, in which lens-holder 4 is arranged. The plate 3 is provided with vertical journals 5 5′ at its ends, by which it is held rotatably in the front ends of parallel rack-bars 6, that serve as means for adjusting the focus of the lens. The said bars 6 slide endwise in suitable guides or keepers secured to the top and bottom of the body 1 of the camera, as shown. The means for adjusting said rack-bars 6 are two horizontal shafts 7, Fig. 4, whose spur-pinions 8 engage them, and a vertical shaft 9, Fig. 4, having bevel-gears 10, that engage similar ones 11 on the shafts 7. The vertical shaft 9 projects through the top of the camera 1 and has a milled head for use in rotating it. It is thus apparent that the lens may be readily adjusted by the shaft and gear mechanism toward or from the curved back of the camera, where the sensitized film is located, for the purpose of focusing the image on the latter and that the panoramic effect is attained by rotating the lens-mount 3 through the arc of a circle required to sweep over the length of the greater arc described by the films at the back of the camera. It is apparent that the flexible tube permits both these movements to be made. The rotation of the lens-mount is effected by a lever-arm 12, fixed horizontally on upper journal 5 of the plate 3.

The light-rays are directed from the lens through a tube 13, which is fixed to and rotates with the plate 3. Said tube is narrow horizontally, (see Fig. 2,) but enlarged and flared vertically, Fig. 3, as required to properly direct the light-rays upon the film. Light-screens 14 are supported upon the free end of plate-springs 15, attached to the lens-mount or plates 3 and projecting horizontally therefrom. Said screens are thin, flat, and oblong wooden plates covered with dark fabric, preferably black velvet. When the tube 13 is swung laterally either way, a screen 14 will come in contact with the side of the camera-box 1, and by the springs 15, which are yielding, the screen will be forced over the end of the light-tube 13, and thus exclude light, so that none can fall upon the film. The latter can then be removed. When the lever 12 is again moved—that is to say, in the opposite direction—to make another exposure, the springs 15 will obviously remove the attached screen 14 from the tube 13.

It has been usual heretofore to arrange and hold the sensitized film and the ground-film for focusing in a fixed position. Consequently the focus could not be changed without throwing either the center or ends of the film out of focus, since when lens is moved the radius of the circle must be adjusted correspondingly, otherwise the distance from the lens to all parts of the circle will not be the same. It is therefore impossible to obtain a sharp image on all portions of the film. I have devised a flexible adjustable holder for both the sensitized film and ground or focusing film, and thereby converted a panoramic camera into a practical instrument which can be perfectly focused for different distances, so as to obtain a perfectly-sharp image on all portions of the film.

My film-holder is composed of two like parts or sections 16 16ª, one, 16, being arranged at the top and the other, 16ª, at the bottom of the camera-body 1, adjacent to the rear curved end of the same. Steel, celluloid, or any other suitable elastic material may be employed in constructing the holder. Each part or section has two grooves, (see Fig. 6,) one being formed in the rib 17 and the other and larger groove between such rib 17 and a thinner rib 18. Both ribs 17 and 18 are connected and held equidistant by means of approximately U-shaped bars 19 and 19ª, Figs. 2 and 6, which are riveted to them, as shown. The central bar 19 is fixed; but the others, 19ª, are adapted to slide. The bars 19ª may have a slot 20 where the rivets pass through (see Fig. 7) to allow movement of the latter when the film-holder is adjusted. The ends of the sections 16 and 16ª are attached to doors 21, which are held slidably in guides 22, formed by flanges attached to the top and bottom angles of the camera-body 1. Said doors 21 have vertical slot 22ª, Figs. 1 and 2, to receive the film-holder proper, and the doors 21 are adjusted, as required, by means of rack-bars 23 and pinions 24. Each rack-bar 23 is fixed inside the camera-box 1, and the pinions 24 are mounted on short shafts 25, having milled knobs 26, and held rotatably in the doors 21, but adapted to slide in slots 27 in the sides of the box. A box-guard 29 is arranged to cover the rack and slot on the inner side, so as to prevent entrance of light. A jam-nut is applied to shafts 25 to lock the latter, and thereby the doors 21, in any adjustment.

It is apparent that by rotating the knobs 26 the pinions 24 will travel on the racks 23 and carry the doors 21 with them, and the doors being connected with the ends of the film-holder 16 16ª the latter will also be adjusted to describe a curve of greater or less radius. One such adjustment is indicated by dotted lines in Fig. 2. This adjustment being made, corresponding to that of the lens-focus, the image on the screen and film will be sharp at every point.

The doors 21 extend beyond the rear end of the box 1, so that when adjusted forward the entrance of light will be prevented by the door overlapping the entrance.

A vertically-adjustable front is a necessary adjunct of the camera. This I provide by adapting the plate or board 3 to slide up or down on the shafts 5 5'. The inner adjacent ends of the latter are flattened on the front side and pass through keepers 30, which are secured to cross-pieces 31, affixed to the plate 3, adjacent to its upper and lower edges. Clamp-screws 32 work through the keepers 30 and bear upon the flattened portions of the shafts 5 5'. It is obvious that this combination of parts enables the plate or lens-mount to be adjusted vertically, as may be required, yet it turns with the said shafts 5 when rotated by the lever 12, as before described.

The aforesaid cross-pieces 31 are adjustably attached to plate 3 by screw-threaded rods 33, (see Figs. 2 and 3,) to which nuts are applied to hold the plate fixed in any adjustment. The object of the adjustment thus provided for is to enable the optical focus or center of the lens to be centered where the rays of light cross directly under the center of the pivot of plate 3. Otherwise the picture would show double lines. This feature of my camera allows different lenses to be used at will.

I do not show the ground-film on which focusing is effected preliminary to exposing the sensitized or photographic film nor the dark slide which forms a necessary adjunct of such film. The film carrier or holder will be a sliding elastic frame adapted to slide into the space or groove between the ribs 17 and 18. It may be made of celluloid, thin steel, or any other suitable material.

It is apparent the lever-arm 12 may be detached and the bellows part 2 pushed back into the camera-chamber when it is desired to pack or store the camera in the least space.

I do not restrict myself to the described means for adjusting the film-holder 16 16ª and also the lens. The sliding rack-bars 6 may be arranged on the outer side of the top and bottom of the camera-body.

Having thus described my invention, what I claim as new, and desire to secure by Letters Patent, is—

1. In a panoramic camera, a flexible film-holder, arranged at the back of the camera, its central portion being fixed and its ends being movable toward or from the lens, substantially as specified.

2. In a panoramic camera, the combination with a lens and body of a camera, of a film-holder which is adapted to be flexed, its end portions being adjustable toward or from the lens, substantially as shown and described.

3. In a panoramic camera, the combination with the camera-body and lens, of an elastic film-holder which is secured or fixed at its middle and its ends being free and adapted for adjustment toward or from said lens, and means for effecting such adjustment, substantially as shown and described.

4. In a panoramic camera, the combination with the camera-body and lens, of an elastic film-holder whose end portions are adjustable toward and from said lens, slides connected with the ends of such holder, and means for adjusting the slides on the sides of the camera, substantially as shown and described.

5. In a panoramic camera, the combination with the camera-body and the lens, slidable plates or doors arranged on the sides of the camera and connected with such film-holder, and racks, pinions and shafts for adjusting the doors, as shown and described.

6. In a panoramic camera, the combination with the camera-body and a lens adapted for adjustment toward or from the back of the camera as required for focusing, and also adapted to be rotated as required for obtaining a panoramic effect, of an elastic film-holder whose end portions may be adjusted toward or from the lens, and means for effecting such adjustment, substantially as shown and described.

7. In a panoramic camera, the elastic film-holder, comprising a rib having a shallow groove, and a second rib separated from the first one by a deep groove, said film-holder being fixed at its middle and its ends being free for adjustment, as shown and described.

8. In a panoramic camera, the combination with the camera-body and the lens, a flexible tube connecting them as specified, of rack-bars adapted to slide in keepers and in which the lens-mount is pivoted and adapted to rotate, a lever-arm for rotating the lens-mount, and shafts and gears connected with the rack-bars for adjusting them, as specified.

9. In a panoramic camera, the combination with the pivoted lens-mount and a light tube or shaft secured thereto, of screens or light-excluders attached to the free ends of springs which are secured to the tube at their other ends and extend alongside the tube, whereby the screens are carried with the latter, and adapted to cover and uncover the inner end of said tube automatically when the latter is moved laterally as described.

In testimony whereof I have signed my name to this specification in the presence of two subscribing witnesses.

MELVIN T. STONE.

Witnesses:
C. L. MUNNERLYN,
A. J. WALKER.